April 19, 1966  D. J. COYLE  3,247,505

OPTICAL FIBER ANALOG-DIGITAL CONVERTER

Filed Oct. 26, 1962  3 Sheets-Sheet 1

INVENTOR.
DANIEL J. COYLE
BY John V. Regan
ATTORNEY

April 19, 1966   D. J. COYLE   3,247,505
OPTICAL FIBER ANALOG-DIGITAL CONVERTER
Filed Oct. 26, 1962   3 Sheets-Sheet 2

INVENTOR.
DANEL J. COYLE
BY John V. Regan
ATTORNEY

April 19, 1966          D. J. COYLE          3,247,505

OPTICAL FIBER ANALOG-DIGITAL CONVERTER

Filed Oct. 26, 1962          3 Sheets-Sheet 3

INVENTOR.
DANIEL J. COYLE
BY John V. Regan
ATTORNEY 3,247,505
OPTICAL FIBER ANALOG-DIGITAL
CONVERTER
Daniel J. Coyle, Haddonfield, N.J., assignor to Radio
Corporation of America, a corporation of Delaware
Filed Oct. 26, 1962, Ser. No. 233,273
7 Claims. (Cl. 340—347)

This invention relates to a fiber optical system for producing an output voltage which digitally represents the angular position of a shaft.

Apparatus for digitally producing the angular position of a shaft is known. Certain of such known apparatus use a disk mounted on a shaft to rotate therewith about a common axis, the disk having a series of concentric code rings or tracks thereon. These code rings usually include an inner ring, one-half of the circumferential length of which has one characteristic, as conductive or transparent, and the other half of the circumference of this track has the opposite characteristic, as non-conductive or opaque. A second track, concentric with and surrounding the first track, has four sectors of equal circumferential length, alternate ones of which have the appropriate opposite characteristics. Further rings, having successively greater number of sectors of equal size, alternate ones of which have the said appropriate opposite characteristics, surround the second ring. As many concentric rings of sectors may be provided as is convenient, each ring (except the first) having twice as many sectors as another ring on the code disk, the ring with the higher number of sectors surrounding the rings with the lesser numbers of sectors. Usually, the sectors are so positioned in their respective rings that at least one radial line exists that coincides with a boundary between sectors in all the rings. If the ring with the most sectors is considered to correspond to the least significant digit position in a binary digital number ($2°$ place), the ring with one-half that many sectors will correspond to the second significant digit (first power of two place) and the rings with successively less sectors will correspond to successively more significant digital positions (higher powers of two). If conductive and non-conductive segments are used, all the conductive segments may be connected to a source of potential. A plurality of brushes may be provided on a fixed radial line, in such manner that one brush contacts the adjacent sector of a ring thereof, whether the sector be conductive or non-conductive. The potential on the brushes are an indication of the angular position of the disk, and therefore of the shaft on which it is mounted, in the binary system of integers, to as many places (or bits) as there are code rings on the code disk. Similarly, a radially extending, narrow line of light on one side of a code disk in which the alternate sectors are respectively transparent and opaque, produces a light pattern which is an indication in the binary code of the angular position of the disk.

When one line of brushes is used, if the pattern of sectors and the radial positioning of brushes is not perfect, an ambiguous indication of the angular position of the disk may be produced as the disk rotates. For example, where the binary indication is changed from 01111 (15) to 10000 (16), if the sector of the ring of sectors corresponding to the highest power of two contacts its brush before the other sectors break contact with their respective brushes, an incorrect indication of 11111 (31) will be given.

Indicating systems with means for preventing such incorrect indications are known. One such error avoiding system uses a binary code, called the Grey Code, which is not the natural binary code. Use of this system involves changing the Grey Code to the natural code. Another error avoiding system is known as the V-scan system. In this system, one brush is used for the units position of the binary indication and a pair of brushes spaced equal distances on each side of a radial line through the units position brush are provided for each of the other ring of sectors of the code disk. The circumferential distance between the brushes may be equal to one-half the circumferential length of a sector of the ring to which the brush is applied, or the distance between the brushes of a pair thereof may be equal to the circumferential length of a digit in the ring corresponding to the zero power of two, or the distance between such brushes may have any intermediate value. The brushes of the pairs thereof in the direction of higher count from the radial line are called the leading brushes and the other brushes of the pair thereof are called the lagging brushes. In the V-scan system, when the value of one appears in any given track or ring, the indication given by the lagging brush of the next higher value track is read. Therefore, where the units brush has a potential corresponding to one thereon, the lagging brush of the next inner ring is connected to the digital position indicator output. If the units brush has no potential, which corresponds to zero, then the leading brush of the next inner ring is connected to the output. A similar selection of leading and lagging brushes takes place for the further rings or tracks. As noted, the V-scan system avoids errors due to inaccurate scanning patterns and due to inaccurate alignment of brushes with respect thereto, except in the zero power of two position.

However, the brush type of indicator involves sliding contacts which are noisy, which wear and require lubrication and which require power to overcome the friction created by the brushes contacting the coded disks. The prior art optical indicators which utilize conventional optical systems, require a considerable amount of energy to supply the light sources, are rather large and heavy, and are rather complex, particularly when used with the V-scan system of producing non-ambiguous outputs.

An optical indicator using fiber optical bundles to carry light from the light source and to project it on one side of a code disk and to carry the light at the other side of the code disk to a light sensitive device or photosensor has been proposed. In this proposed optical indicator, however, light sources are turned on and off, slowing the response thereof, due to the time necessary for the illumination to increase from zero to its desired value and for the illumination to decay. Furthermore, light sources that are turned on and off usually do not last as long as light sources that are always on.

It is therefore an object of this invention to provide an improved optical device for producing an unambiguous natural binary indication of an analog position including light sources which are lit continuously during the operation of the device.

It is an object to provide a device for producing an unambiguous natural binary indication of an analog position and avoiding the turning on and off of light bulbs or the like and also avoiding the use of brushes.

It is an object of this invention to provide an optical device of reduced size and weight and complexity and of greater reliability.

A further object of this invention is to provide an optical analog to digital translator of high speed.

One device, according to this invention, includes a thin movable disk or sheet having a code pattern of rings or tracks of opaque and transparent sectors thereon. Light is gathered from a continuously lit light source and projected by the ends of fiber optical bundles on the patterns at one position on the track or ring corresponding to the zero power of two and to properly selected positions on the tracks corresponding to the indication of the first and higher powers of two. Photosensitive elements or photosensors such as photodiodes or photoresistors are positioned on the opposite side of the code disk or sheet from the ends of the fiber optical bundles and are exposed to the continuously lit lights unless occulted by the pattern on the code disk. The electrical outputs of the photosensors is applied to electronic circuits which give unambiguous, digital indications in natural binary code of the position of the pattern with respect to the adjacent ends of the light bundles and photosensors, without switching the light sources on or off, but using occultation to provide the translation to binary code. If desired, fiber optical pick-up bundles may be inserted between the disk and the photosensors. The fiber optical bundles may be used to achieve optimum positioning of the photosensors by permitting bends and twists in the light paths difficult or impossible to achieve with conventional optics.

This invention is more fully explained in the following detailed description thereof, taken with the accompanying drawing in which.

Fiber optical bundles, used in the device of this disclosure for carrying light from light sources and to photosensors, comprise a plurality of fine filaments of glass of circular cross section and of high index of refraction surrounded by thin jackets of glass of lower index of refraction, laid more or less parallel in a plastic matrix, such as epoxy resin. Each bundle of filaments with its matrix has ends cut in a plane transverse to the filament axis and optically polished. Light applied to one end of a bundle is projected to the other end thereof. The ends of the bundles may have any convenient shape. The input ends may be round to pick up light from a light source and the output end may have the same configuration but of slightly smaller size than a code sector of the outer ring of a code disk. The fiber optical bundles may be bent or twisted with substantially no loss of efficiency of light transfer therethrough.

Figure 6:
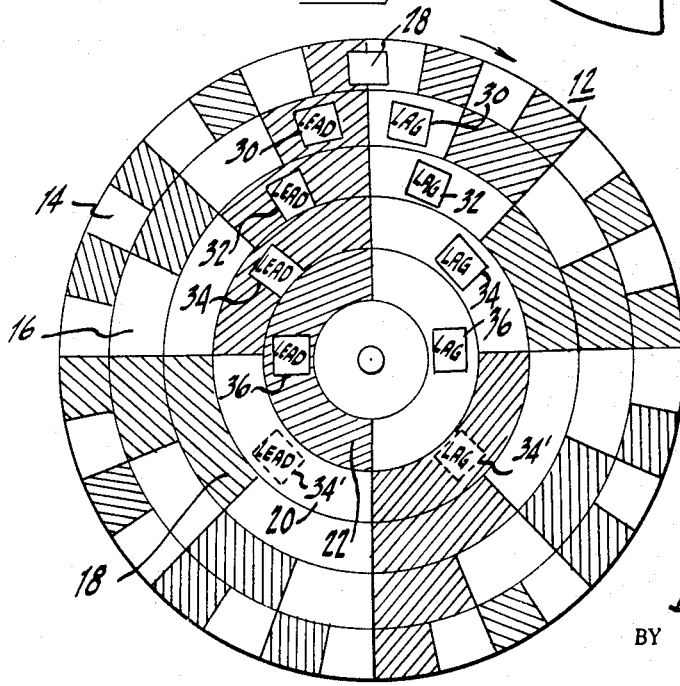
FIGURE 6 is a diagrammatic showing of a code disk and also showing the positions of fiber optical bundle ends used in the device of this invention.

A code disk 12, useful in the herein described device is shown in FIGURE 6. The code pattern presented by this code disk comprises a plurality (here shown as 5) of concentric rings or tracks 14, 16, 18, 20 and 22, the center track 22 having only two sectors, one transparent and the other opaque. The next track 20 has four sectors, two transparent and two opaque, the transparent and opaque sectors being alternately positioned around the circumference of the ring or track. Each successive track 18, 16 and 14 has twice as many opaque and transparent sectors, alternately positioned, as a previous track.

The sectors are so arranged that a diameter or fiducial line exists which bounds one transparent sector in each ring. While only five rings are shown in FIGURE 6, as many rings may be provided as is convenient. As will be more fully described below, the code disk used in the encoder device of FIGURE 1 may have 7, 8, 9 or more rings. The outermost ring 14 corresponds to two to the zero power digit of natural binary numbers and the next successive rings 16, 18, 20 and 22 correspond respectively to the digits expressing the next successively higher powers of two. The indication of the position of a shaft 24 on which the disk is mounted is provided by the light pattern resulting when light is applied to one side of the code disk or wheel on the code rings. This light is projected on the code rings of code wheel 12 (FIGURES 1 and 7) by fiber optical bundles 27, 29, 31. . . . A fiber optical bundle is arranged so that a rectangular end face 28 thereof (FIGURE 6) is adjacent to the outside code ring, which has the most segments thereon. Pairs of fiber optical bundles are so arranged that a rectangular end face 30—30, 32—32, 34—34, or 36—36 of each bundle of a pair thereof is adjacent to a ring. The radially outermost bundle face 28 is positioned on a radial line to project light from lamp 40 (FIGURE 7, not shown in FIGURE 1) on the outer code ring 14, and each successive pair of other bundles are positioned symmetrically with respect to said radial line and the bundle faces 30—30, for example, of a pair are spaced equidistant from this line and apart different distances for different pairs, increasing with digital significance. However, if for any reason, such as space requirements, a pair of rectangular faces, bundle faces 34—34, are not positioned to illuminate their respective sectors and the rectangular faces 34—34 are spaced so far apart that they illuminate next adjacent sectors of the ring to which they are applied, as shown in FIGURE 6 at 34'—34', then the photosensors that are illuminated through the coded wheels will give a complementary output as will be explained below.

It may be desirable to so position the photosensors 100, 101, 102, 103, 104 (FIGURE 7) that the light from the above described fiber optical bundles 27, 29—29, 31—31 upon passing through the code disk 12, does not hit their respective photosensors. Further optical bundles 60, 62—62, 64—64 may be provided, positioned in one to one registry with the above described optical bundles 27, 29—29, 31—31 and on the opposite side of the disk 12 therefrom. While not so shown in FIGURE 7, the ends of the further bundles 60, 62—62, 64—64 adjacent the code disk 12 may be of the size and shape of the smallest code sector and the other ends of the further optical bundles 60, 62—62, 64—64 may be found in cross section and a bit smaller in diameter than the photosensor 100, 101, 102, 103, 104 on which they throw light. It will be understood that the further optical bundles 60, 62—62, 64—64 may be omitted, if the photosensors can be positioned so that they will receive light, through the code disk, directly from the first described optical bundles 27, 29—29, 31—31, and in such a manner that each photosensor receives light from only one bundle of the remaining bundles, since applying light to one photosensor from more than one of the remaining bundles would cause erroneous readings.

Figure 7:
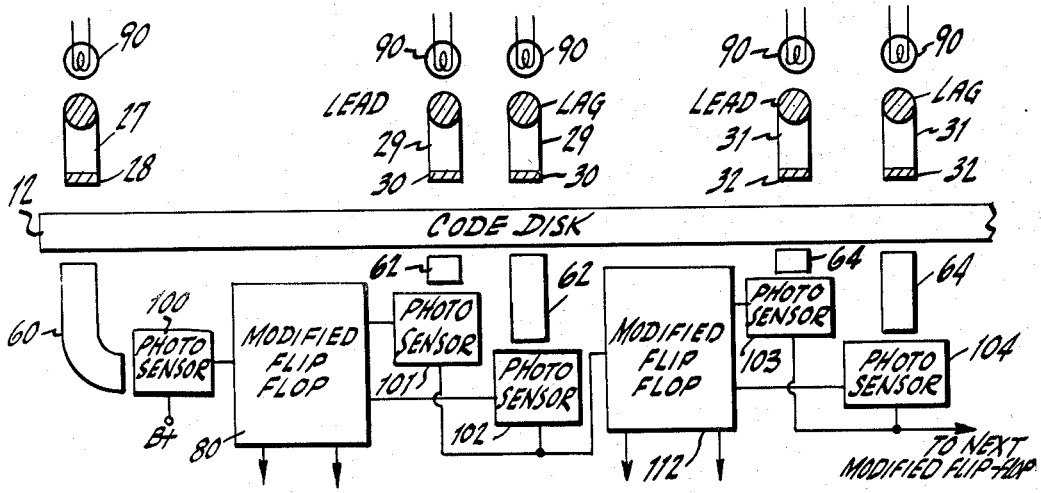
FIGURE 7 is a diagram used to explain an embodiment of this invention.

FIGURE 7 illustrates diagrammatically the structure of the encoder device. In FIGURE 7, the code disk 12 rotates about an axle or shaft 24 (not shown in FIGURE 7) to the right as viewed in FIGURE 7. As noted above, only two, cooperating optical bundles 27 and 60 are used with the outer ring which includes the most code sectors. Two pair of optical bundles 29—29, and 62—62; 31—31 and 64—64 are provided for each successive ring of sectors arranged as leading and lagging bundles, as noted above. If pictorially illustrated in FIGURE 7, one only of each pair of leading and lagging bundles would show, since the other bundle would be behind the bundle illustrated. To avoid this difficulty of illustration, and for the purpose of explanation only, the leading and lagging bundles are so labeled and are shown as being radially arranged.

In FIGURE 7, all light sources 90 are on one side of the coded disk 12 and these light sources are lit at all times while all photosensors 100, 101, 102, 103, 104 are on the other side of the disk 12. The wires may be so arranged that no signal carrying wires cross from one side of the code disk to the other. Fiber optical bundles 27, 29—29, 31—31 are arranged on one side of disk 12 between a light source 90 and a code sector ring and fiber optical bundles 60, 62—62, 64—64 are arranged on the other side of the disk between a code sector ring and respective photosensor 100, 101, 102, 103, 104. The light input ends of all fiber optical bundles 27, 29—29, 31 and 31 are exposed to light bulbs 90 which are continuously on. The light output of the two cooperating fiber optical bundles 27 and 60 which are aligned with the first code ring, is applied to a photosensor 100, and the output of this photosensor 100 is applied to the input of a modified flip-flop circuit 80 having photosensors 101 and 102 in the individual output connections thereof. Light shines on these photosensors 101 and 102 from the output ends of second pairs of fiber bundles 29—29, 62—62 which are positioned adjacent to the second code ring and the outputs of the photosensors 101, 102 are connected in parallel to the input of a second similar modified flip-flop circuit 112. The photosensors 103, 104 of the second modified flip-flop circuit 112 are exposed to the light output ends of the two pairs of fiber bundles 31—31, 64—64 positioned adjacent the next code ring. This connection of modified flip-flop circuits and photosensors is continued for all the fiber optical bundles associated with each of the sectored rings, the last modified flip-flop circuit not having photosensors in their output connections. The electrical output signals are taken from the several modified flip-flop circuits as will be explained. The bundles between the code wheel 12 and the photosensors 101, 102, 103, 104 may be omitted.

Figure 8:
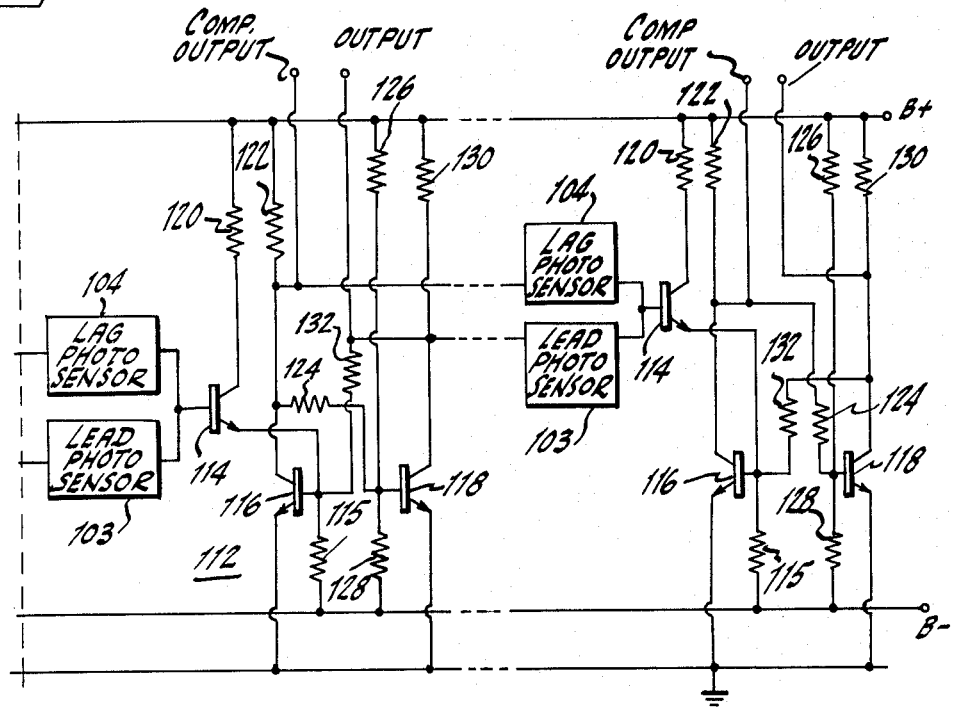
FIGURE 8 is a circuit diagram used in the embodiment of FIGURE 7.

The circuit diagram of the flip-flop circuit used in FIGURE 7 is shown in FIGURE 8. Each modified flip-flop circuit 80 and 112 of FIGURE 7, comprises three NPN transistors 114, 116 and 118. The input to a modified flip-flop 80 or 112 is applied to the base of transistor 114 from the previous photosensor 100 (there being one only connected to the input of the first modified flip-flop circuit 80) or from the paralleled output of a pair of photosensors 101 and 102, for example (for all other stages). The collector of transistor 114 is connected to a source of direct potential which is positive with respect to ground through a resistor 120 and the emitter of transistor 114 is connected to the base of transistor 116. The base of transistor 116 is connected to a source of direct negative potential through resistor 115. The collector of transistor 116 is connected to a source of direct potential, which is positive with respect to ground, through a resistor 122. The collector of transistor 116 is also connected to one terminal of lag photodiode 104 and through a resistor 124 to the base of third transistor 118. The emitter of transistor 116 is connected directly to ground. The base of transistor 118 is connected through resistor 126 to a direct potential source which is positive with respect to ground. The base of transistor 118 is also connected to a direct potential source which is negative with respect to ground through resistor 128. The emitter of transistor 118 is connected directly to ground. The collector of transistor 118 is connected through a resistor 130 to a source of direct potential which is positive with respect to ground, to one terminal of lead photosensor 103, and also through a resistor 132 to the base of transistor 116. The other terminals of photosensors 103 and 104 are connected to the base of transistor 114 comprising a part of the next modified flip-flop circuit.

The operation of the circuit of FIGURE 8 is as follows: In its quiescent stage, that is, when no light is applied to either photosensor 103 or 104 (if it be two) the biases applied to the first two transistors 114 and 116 is such that they are non-conductive and the third transistor 118 is conductive. The voltage on the collector of transistor 118 is nearly zero, whereby voltage is applied through resistor 120 and transistor 114 to photosensor 103 energizing photosensor 103. If photosensor 100 or either of 103 or 104 is illuminated through the code wheel, positive potential is applied to the base of first transistor 114 and positive voltage is applied to the base of the second transistor 116 through the first transistor 114 collector to emitter path. The second transistor 116 becomes conductive and potential is applied to the lag photosensor 104, energizing it. At the same time, the voltage of the base of the third transistor 118 becomes more negative whereby the third transistor 118 becomes non-conductive and the potential on its collector rises whereby potential is removed from lead photodiode 103. In this manner, when no light shines on either photosensor in the input of any of the several modified flip-flop circuits, the output photosensor in the leading position is energized and the output photosensor in the lagging position is deenergized. When the light shines on either input photosensor, the output photosensor in the lagging position is energized and the output photosensor in the leading position is deenergized. Therefore, when the signal produced by a code ring is zero, the leading position of the next code ring is read and when the signal produced by any code ring is one, the lagging position of the next code ring is read. This is the required operation of a so-called V-scan. The bit output signals are taken from the collectors of the third transistors 118, a zero voltage being taken from the collector of the transistor 118 when neither photosensor is illuminated and a one voltage being taken from this collector when either one of the photosensor is illuminated. The complementary output (an indication of 1 as the complement of 0 and of 0 as the complement of 1) may be taken from the collector of the second transistors 116.

Advantage may be taken of the fact that the apparatus herein described provides complementary outputs as well as direct outputs. As noted above in connection with the description of FIGURE 6, if there be insufficient space for placing the ends of the fiber optical bundles in their correct positions on their corresponding code rings, this correct position being diagrammatically illustrated at 34 in the fourth ring 20, these ends 34 of the fiber optical bundles may be moved along the code ring 20 a distance equal to the circumferential length of one code sector in that ring to the position 34′ shown in dotted lines at the complementary position with respect to the fiducial line. In this dotted position 34′, the condition of transparency or opacity of the sector of the code ring 20 is reversed from its previous condition, whereby the photosensors associated with that ring 20 are exposed to the complementary condition of illumination. Therefore, in inverting the connections of the outputs of the modified flip-flop circuit which is responsive to the fiber optical bundles in the complementary position 34′, correct outputs, as distinct from complementary outputs, may be taken from the circuit responsive to that code ring. The connections of the photosensors sensitive to the light applied to the next code ring will, of course, also be inverted.

Figure 1:
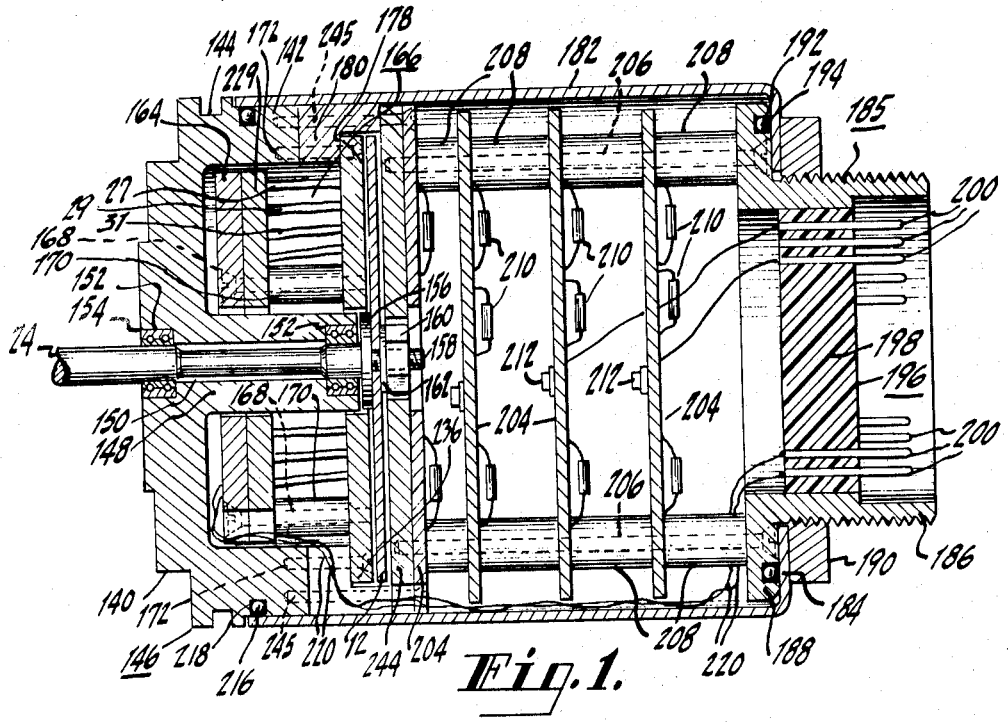
FIGURE 1 is a longitudinal section of apparatus embodying this invention.

A suitable arrangement of the encoder apparatus 146 is shown in FIGURES 1–5. In FIGURE 1 a cylindrical cup-shaped cap 140 is provided. This cap has a reduced diameter portion 142 at the right end thereof as viewed in FIGURE 1 and a groove 144 in the larger diameter outer surface. The groove may be used for mounting the encoder 146 on a mounting. A spacer 180, comprising a large sector of a cylinder, having an outside diameter equal to the reduced outside diameter of the cap 140, and so mounted that its open portion faces downwards as viewed in FIGURE 1, is positioned concentric with the right end of the cap 140 and in contact therewith. This spacer 180 has a portion providing a shoulder 178 facing to the right as viewed in FIGURE 1.

The cap 140 has a centrally arranged axially extending pedestal 148 therein, there being a cylindrical hole 150 through pedestal 148. The ends 152 of the hole are enlarged and anti-friction bearings 154 are provided, one in each of the enlarged hole portions 152. A shaft 24 extends through the hole 150 and is mounted for rotation in the anti-friction bearings 154. This shaft 24 has an enlarged disk 156 integral with one end thereof and a reduced threaded extension 158 extending from the disk 156 and in axial alignment with the shaft 24. The code disk 12, such as the one shown in FIGURE 6, but which may have more code rings thereon, is fixed on extension 158 and is held against disk 156 by nut 160 and lock washer 162. In smaller devices of this nature, the extension 158 may be omitted and code disk 12 may be fixed to disk 156 as by an epoxy bond. A lamp plate 164 (further described below) and a fiber optical converter 166 are positioned in cap 140 surrounding pedestal 148. The converter 166 comprises plates 229 and 236 held in spaced relation as will be explained below. The lamp plate 164 is mounted on the fiber optical converter 166 by means of bolts 168 threaded into plate 236. A spacer 170 separates plates 229 and 236. The lamp plate 164 and fiber optical converter 166 as an assembly is mounted on the cap 140 by means of screws 172 threaded into cup 140 and extending through spacer 180 and holding plate 236 against shoulder 178.

A photosensor plate 244 (described below) and a plurality of circuitry support boards 204 are supported by bolts 206 extending through a flange 188 of a socket support 185 (to be described) and threaded into the photodiode plate 244. Spacers 208 are provided between the flange 188 and one circuitry support board 204 and between each circuitry support board 204 and the near one thereto. The circuitry support board 204 adjacent the photosensor plate 244 has a hole therethrough to provide clearance for nut 160 and threaded shaft extension 158. This circuit support plate 204 may have a gap at the lower part thereof as viewed in FIGURE 1 to permit passage of wires. Circuit elements comprising resistors 210 and transistors 212 are mounted on the circuit support plate. The photosensor plate 244 and the element mounted thereon may be mounted on cup 140 by screws 245 extending through spacer 180 and threaded into cup 140.

A cylindrical housing 182 has an inside diameter of one end thereof such as to closely fit the outside diameter of the right end 142 of the cap 140 and the spacer 180. This housing 182 has an inturned flange 184 at the end thereof opposite the end that fits cap 140. The socket support 185 comprising a cylindrical portion 186, with which the radially extending flange 188 is integral, extends through the hole at the flanged end 184 of the housing 182, the flange 188 of the support contacting the inner surface of the inturned flange 184. The external surface of the cylindrical portion 186 of the socket support 185 is threaded and a nut 190 is tightened down on the outside of the inturned flange 184 to hold it against the flange 188 of the socket support. If desired, an axially extending circular groove 192 may be provided in the contacting surface of flange 184 to receive a resilient O-ring 194 for hermetic sealing of the socket support to the housing 182 and an O-ring 216 may be provided in a groove 218 in the outer surface of the reduced portion 142 of the cup 140 to complete hermetic sealing of the assembled encoder apparatus 146. A socket 196 comprising an insulating body 198 and conductive pins 200 extending in an axial direction through the body 198, is provided in the socket support and is supported thereby.

As noted, wires 220 from the light plate 164 run therefrom through the gap in the spacer ring 180 and through the gaps in plate 244 and 204 to the appropriate pins 200 in the socket 196 or to the appropriate connections on the circuitry support boards 204, and from each of the circuit support boards 204 to their appropriate pins 200.

Figure 2:
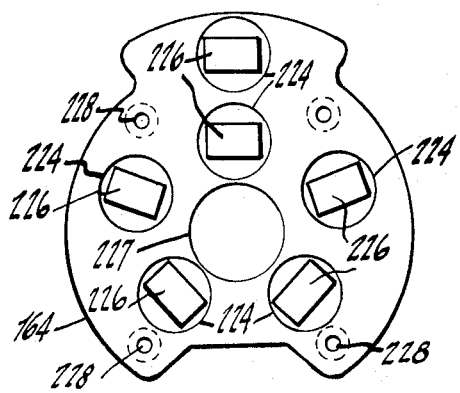
FIGURES 2–5 are plan views of various elements of the apparatus of FIGURE 1.

The details of the lamp plate 164 is explained in connection with FIG. 2. This lamp plate 164 comprises a disk having four mounting holes 228 for receiving support bolts 168 of FIG. 1. The holes 228 are counter bored at the back side of the plate 164 as viewed in FIG. 2, that is, the left side as viewed in FIG. 1, to receive the heads of the assembly screws 168. A plurality, here shown as six, holes 224 are provided in conveniently spaced positions part-way through plate 164 and reflectors 226 containing light bulbs, such as "grain of wheat" bulbs are held in each hole in any convenient manner. A hole 227 is provided through plate 164 for receiving the pedestal 148. The lower radially extending edges of the plate as viewed in FIG. 2 are cut away as shown to provide passage for wires 220 (FIG. 1).

Figure 3:
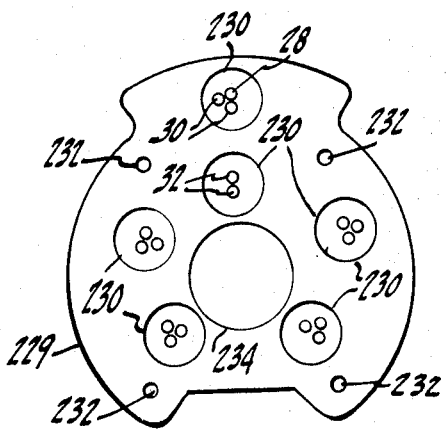

FIG. 3 shows plate 229 comprising the left end of the fiber optical converter, as viewed in FIG. 1, that is, the end of the fiber optical converter 166 that is adjacent the lamp plate 164. Holes 230 are bored in plate 229, a little smaller in diameter but in registering position with respect to the holes 224 in plate 164. The round ends (such as 28, 30, 30) of several, here shown as three, fiber optical bundles (such as 27, 29, 29 of FIGS. 7 and 9) in a plastic matrix, and flush with the surface of plate 229 in each of holes 230, while two bundles such as 32, 32 of FIGS. 7 and 9 in their matrix extend through their holes 230. Thereby 17 fiber optical bundles are provided. Mounting holes 232 in registry with mounting holes 228 of lamp plate 164, extend through plate 229 and a hole 234 is provided in the center thereof to receive the pedestal 148. The radial edges of plate 229 correspond in shape to the edges to plate 164.

Figure 4:
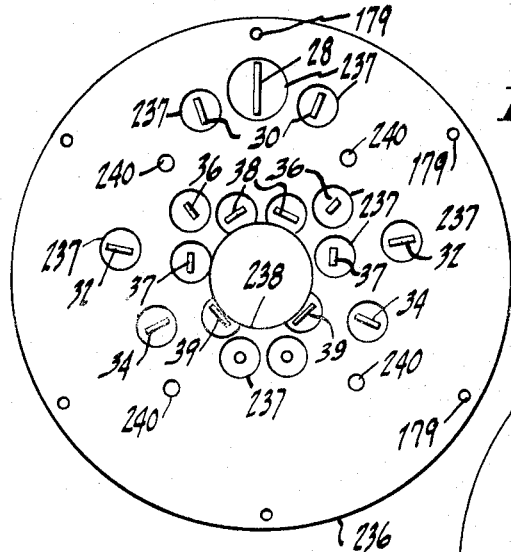

FIG. 4 shows the side plate 236 of the fiber optical converter 166 that is adjacent the code wheel 12 in the arrangement of FIG. 1. The plate 236, comprising the right end of fiber optical converter 166 as viewed in FIG. 1, is round and has a diameter sufficiently great to fit against shoulder 178 (FIG. 1). Six mounting holes 179 are provided to receive screws 172. A holes 238 for the pedestal 148 is provided through the middle of the plate 236 and threaded mounting holes 240 are provided in registry with the mounting holes of plates 164 and 229 to receive screws 168. If desired, one or more alignment pin holes may be provided.

As indicated in FIG. 1, fiber optical bundles such as 27, 29, 29, 31, 31 of FIGS. 7 and 9, extend from plate 229 to plate 236. The position and shape of one end, the light input end, of each fiber bundle is shown and has been described in connection with FIG. 3. FIG. 4 shows the position and shape of the other end, the light output end, of the fiber optical bundles. One fiber optical bundle end 28 is positioned to throw light on the outside code track or ring 14 of coded disk 12. This fiber optical bundle end 28 is of rectangular shape and of the circumferential width of or slightly less width than the circumferential width of a segment of code track 14. This fiber optical bundle end 28 extends radially and may be a little longer than the radial width of the code track 14 with which it is associated since the outer end of the rectangle may be off the code disk 12. The radially extending ends of the second 30, 30, third 32, 32, fourth 34, 34 and fifth 36, 36 pairs of fiber optical bundle ends illuminate the second 16, third 18, fourth 20 and fifth 22 code track in the V-scan manner, as described above. The fifth 36, 36 and successive pairs of fiber optical bundle ends may be made shorter and wider than other bundle ends or even round, since the sectors of their corresponding code tracks are wider than the sectors of prior tracks. The sixth 37, 37, seventh 38, 38, and eighth 39, 39 pairs of fiber optical bundle ends may be rectangular and their long dimension may extend at right angles to radii through them, each pair of bundles illuminating its respective track (not shown). As stated above, if space requirements so dictate, the ends of the bundles of any pair (or pairs) of bundles may each be displaced angularly one sector and may illuminate the next sectors to the sectors normally illuminate in accordance with the V-scan.

Figure 5:
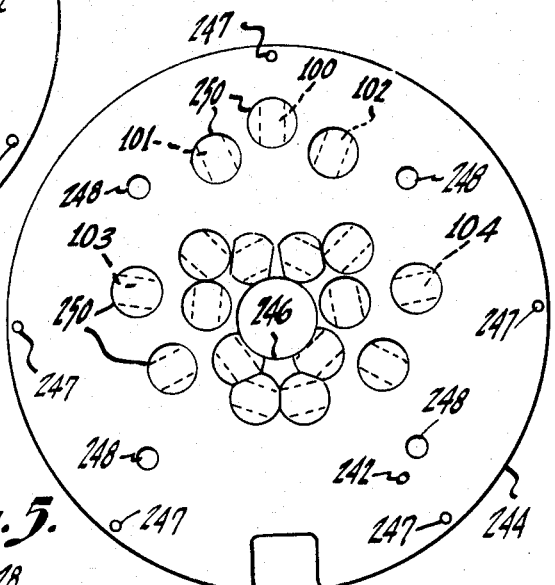

The face of the photosensor plate 244 adjacent the code disk 12, that is, the left face as viewed in FIG. 1, is shown in FIG. 5. This plate 244 is round, is larger in diameter than plate 236 and has a central hole 246 to receive the nut 160 on shaft extension 158 and has a cut out in the bottom to allow the wires 220 to run to the light plate. Four threaded mounting holes 248 are provided to receive mounting bolts 206. A plurality of holes 250 are bored into the face of disk in registry with holes 237 in plate 236. A photosensor such as 100, 101, 102, 103 and 104 of FIGS. 7 and 8 is positioned in each of these holes 237. These photosensors are positioned and oriented to receive light from the corresponding fiber optical bundle end when not occulted by an opaque sector of a code ring. Mounting holes 247 may be provided to receive screws 245.

The above-described structure does not include fiber optical bundles leading from the coded disk to the corresponding photosensor. If desired, such fiber optical bundles may be provided, and in such case, one end of each of the fiber optical bundles would be positioned in a support plate in an array similar to that shown in FIG. 4. The other ends of each fiber optical bundles would be positioned to illuminate a respective photosensor positioned and supported in any convenient manner.

In one practical embodiment of this invention an encoder has been built which is about 2½ inches in diameter, about 3¼ inches long, weighs about 9 ounces and has a resolution as high as 9 bits per revolution, its output being in natural binary code and in complementary binary code. This encoder contains all elements necessary for operation thereof except the sources of potential.

What I claim is:

1. Electro-optical apparatus for representing the angular position of a rotatable shaft as a binary digital quantity comprising:
   a disk fixed for rotation on a shaft,
   said disk having a plurality of concentric tracks thereon,
   each of said tracks having alternately arranged transparent and opaque sections,
   means for applying light to one side of said disk and to a point on each of said tracks,
   photosensitive means for picking up light that passes through transparent sections of said tracks, and
   a modified flip-flop circuit having an input and an output,
   one of said photosensitive means being connected to said input and another of said photosensitive means being connected in said output,
   said circuit applying an energizing voltage to said photosensitive means in said output circuit responsive to the application of light to said photosensitive means in said input circuit.

2. Electro-optical apparatus for representing the angular position of a rotatable shaft as a binary digital quantity comprising:
   a disk fixed for rotation on a shaft,
   said disk having a plurality of concentric tracks thereon,
   each of said tracks having alternately arranged transparent and opaque sections,
   Means for applying light to one side of said disk and to a point on each track,
   photosensitive means for picking up light that passes through transparent sections of said tracks,
   a modified flip-flop circuit having an input and an output,
   one of said photosensitive means being connected to said input and another of said photosensitive means being connected in said outputs,
   said circuit applying an energizing voltage to said photosensitive means in said output circuit responsive to the application of light to said photosensitive means in said input circuit, and an
   electrical output terminal connected to the output of said flip-flop circuits to indicate the condition of energization of said output photosensitive means.

3. Electro-optical apparatus for representing the angular position of a rotatable shaft as a natural binary digital quantity comprising:
   a disk fixed for rotation on a shaft,
   said disk having a plurality of concentric tracks thereon,
   each of said tracks having alternately arranged transparent and opaque sections,
   means for applying light to one side of said disk and to at least one point on one of said tracks and to at least two spaced points on others of said tracks,
   photosensitive means for picking up light that passes through transparent sections of said tracks,
   a modified flip-flop circuit having an input and a plurality of outputs,
   one of said photosensitive means being connected to said input and others of said photosensitive means being connected in said outputs,
   said circuit applying an energizing voltage to one or the other of said photosensitive means in said output circuit responsive to the application of light to said photosensitive means in said input circuit,
   said circuit applying energizing voltage to the other of said photosensitive means in said output circuit in respect to lack of application of light to said photosensitive means in said input circuit.

4. Electro-optical apparatus for representing the angular position of a rotatable shaft as a natural binary digital quantity comprising:
   a disk fixed for rotation on a shaft,
   said disk having a plurality of concentric tracks thereon,
   each of said tracks having alternately arranged transparent and opaque sections,
   means for applying light to one side of said disk and to at least one point on one of said tracks and to at least two spaced points on others of said tracks,
   photosensitive means for picking up light that passes through transparent sections of said tracks,
   a modified flip-flop circuit having an input and a plurality of outputs,
   one of said photosensitive means being connected to said input and others of said photosensitive means being connected in said outputs,
   said circuit applying an energizing voltage to one or the other of said photosensitive means in said output circuit responsive to the application of light to said photosensitive means in said input circuit,
   said circuit applying energizing voltage to the other of said photosensitive means in said output circuit in respect to lack of application of light to said photosensitive means in said input circuit, and
   electrical output terminals connected to the outputs of said flip-flop circuits to indicate the condition of energization of said output photosensitive means.

5. Electro-optical apparatus for representing the angular position of a rotatable shaft as a natural binary digital quantity comprising:
   a disk fixed for rotation on a shaft,
   said disk having a plurality of concentric tracks thereon,
   each of said tracks having alternately arranged transparent and opaque sections,
   means for applying light to one side of said disk and to one point on one track, means for applying light to one side of said disk and to spaced point on a second track, said spacing being substantially equal to the circumferential length of a section of said second track, photosensitive means arranged to pick up light that passes through transparent sections of said tracks, a first modified flip-flop circuit having an input and a plurality of outputs, said photosensitive means adjacent said first track being connected to the input of said first modified flip-flop circuit, the photosensitive means receiving light through said second track being connected individually in the output circuits of said first flip-flop circuit, a second modified flip-flip circuit having an input and two output circuits, the photosensitive means in the output circuits of said first modified flip-flop circuit both being connected to the input circuit of said second flip-flop circuit, there being further photosensitive means individually connected in the output circuit of said second flip-flop circuit, said flip-flop circuits applying energizing potentials to one of said photosensitive means in an output circuit thereof responsive to light being applied to a photosensitive means connected to the input circuit thereof, and applying energizing potentials to the other of said photosensitive means in an output circuit thereof responsive to no light being applied to the photosensitive means connected to the input circuit thereof.

6. Electro-optical apparatus for representing the angular portion of a rotatable shaft as an natural binary digital quantity comprising:

a disk fixed for rotation on a shaft, said disk having a plurality of concentric tracks thereon, each of said tracks having alternately arranged transparent and opaque sections, means for applying light to one side of said disk and to spaced point on one track, said spacing being substantially equal to the circumferential length of a section of said one track, means to apply light to spaced points on a further track, said last mentioned spacing being substantially equal to the circumferential length of an even number of sections of said further track, photosensitive means arranged to pick up light that passes through transparent sections of said tracks, a first modified flip-flop circuit having an input and a plurality of outputs, the photosensitive means receiving light through said one track being connected individually in the output circuits of said first flip-flop circuit, a second modified flip-flop circuit having an input and two output circuits, the photosensitive means in the output circuits of said first modified flip-flop circuit both being connetced to the input circuit of said second flip-flop circuit, the photosensitive means receiving light through said second track being individually connected in the output circuit of said second flip-flop circuit, a further modified flip-flop circuit having an input and two outputs, the photosensitive means in the output of the second flip-flop circuit being connected to the input of the further flip-flop circuit, said flip-flop circuits applying energizing potentials to one of said photosensitive means in an output circuit thereof responsive to light being applied to a photosensitive means connected to the input circuit thereof, and applying energizing potentials to the other of said photosensitive means in an output circuit thereof responsive to no light being applied to the photosensitive means connected to the input circuit thereof, each of said flip-flop circuits also having electrical output terminals connected to indicate the condition of energization of each of the photosensitive means in its output, one of said terminals indicating whether or not light is applied to an input photosensitive means and the other terminal giving a complementary indication, the connection of the indication and of the complementary indication being reversed for the modified flip-flop circuit to the input of which photosensitive means are connected to which light is applied through said last mentioned track.

7. Electro-optical apparatus for representing the angular position of a rotatable shaft as a naturl binary digital quantity comprising:

a disk fixed for rotation on a shaft, said disk having a plurality of concentric tracks thereon, each of said tracks having alternately arranged transparent and opaque sections, means for applying light to one side of said disk and to one point on one track, means for applying light to one side of said disk and to spaced point on a second track, said spacing being substantially equal to the circumferential length of a section of said second track, means to apply light to spaced points on a further track, said last mentioned spacing being substantially equal to the circumferential length of an even number of sections of said further track, photosensitive means arranged to pick up light that passes through transparent sections of said track, a first modified flip-flop circuit having an input and a plurality of outputs, said photosensitive means adjacent said first track being connected to the input of said first modified flip-flop circuit, the photosensitive means receiving light through said second track being connected individually in the output circuits of said first flip-flop circuit, a second modified flip-flop circuit having an input and two output circuits, the photosensitive means in the output circuits of said first modified flip-flop circuit both being connected to the input circuit of said second flip-flop circuit, the photosensitive means receiving light through said further track being individually connected in the output circuit of said second flip-flop circuit, a further modified flip-flop circuit having an input and two outputs, the photosensitive means in the output of the second flip-flop being connected to the input of the further flip-flop circuit, said flip-flop circuits applying energizing potentials to one of said photosensitive means in an output circuit thereof responsive to light being applied to a photosensitive means connected to the input circuit thereof, and applying energizing potentials to the other of said photosensitive means in an output circuit thereof responsive to no light being applied to the photosensitive means connected to the input circuit thereof, each of said flip-flop circuits also having electrical output terminals connected to indicate the condition of energization of each of the photosensitive means in its output, one of said terminals indicating whether or not light is applied to an input photosensitive means and the other terminal giving a complementary indication, the connection of the indication and of the complementary indication being reversed for the modified flip-flop circuit to the input of which the photosensitive means are connected to which light is applied through said last mentioned track.

(References on following page)

References Cited by the Examiner

UNITED STATES PATENTS

| | | | |
|---|---|---|---|
| 2,950,471 | 8/1960 | Hoeppner | 340—347 |
| 2,993,200 | 7/1961 | Walker et al. | 340—347 |
| 2,995,666 | 8/1961 | Wood | 307—88.5 |
| 2,997,605 | 8/1961 | Fortini | 307—88.5 |

OTHER REFERENCES

IBM Technical Disclosure Bulletin, vol. 4, No. 7, page 85, December 1961.

Notes on Analog-Digital Conversion Techniques, Alfred K. Susskind, pages 6-40 thru 6-55, 1957.

MALCOLM A. MORRISON, *Primary Examiner.*